United States Patent Office 3,649,627
Patented Mar. 14, 1972

3,649,627
PRODUCTION OF N-SUBSTITUTED MORPHOLINES
Ernst Fuerst, Neustadt, Karl Adam, Ludwigshafen, Herwig Hoffmann, Frankenthal, Kurt Pilch, Ludwigshafen, Siegfried Winderl, Heidelberg, and Walter Sanne, Ludwigshafen, Germany, assignors to Badische Anilin- & Soda-Fabrik Aktiengesellschaft, Ludwigshafen, Germany
No Drawing. Filed Sept. 19, 1969, Ser. No. 859,570
Claims priority, application Germany, Sept. 25, 1968, P 17 95 393.4; Aug. 27, 1969, P 19 43 500.8
Int. Cl. C07d 87/24, 87/26
U.S. Cl. 260—247                                  7 Claims

ABSTRACT OF THE DISCLOSURE

An improved process for the production of N-substituted morpholines by heating a N-substituted bis-($\beta$-hydroxyethyl)-amine or bis-($\beta$-hydroxypropyl)-amine in the presence of a water-eliminating catalyst, the improvement consisting in carrying out the reaction at a temperature of from 180° to 270° C. in the presence of water or in the presence of a high-boiling organic solvent which is inert under the reaction conditions.

---

This invention relates to an improved process for the production of N-substituted morpholines by heating a N-substituted bis-($\beta$-hydroxyethyl)-amine or bis-($\beta$-hydroxypropyl)-amine in the presence of a water-eliminating catalyst.

It is known from U.S. Pat. 2,776,972 that morpholines can be obtained by heating diethanolamines together with sulfuric acid and then treating the reaction mixture with alkalies. This process has the disadvantage that sulfuric acid is highly corrosive and that major amounts of alkali metal salts are formed as a result of the alkali treatment. Moreover, it is known from U.S. Pat. 2,597,260 and German Pat. 844,006 that morpholines are obtained by heating the appropriate diethanolamines in the presence of a water-eliminating catalyst. These processes have the disadvantage that the catalysts used are contaminated by cracked products within a short time and their activity thus decreases rapidly.

It is an object of this invention to provide a process for the production of N-substituted morpholines in which it is not necessary to use corrosive media and in which no alkali metal salts are formed. Another object is to provide a process in which a smaller amount of cracked products is formed than in the prior art processes and consequently the water-eliminating catalysts used have a much longer life.

In accordance with this invention these and other objects and advantages are achieved in an improved process for the production of N-substituted morpholines by heating a N-substituted bis-($\beta$-hydroxyethyl)-amine or bis-($\beta$-hydroxypropyl)-amine in the presence of a water-eliminating catalyst wherein the improvement comprises carrying out the reaction at a temperature of from 180° to 270° C. in the presence of water or in the presence of a high-boiling organic solvent which is inert under the reaction conditions.

Preferred starting materials are N-substituted bis-($\beta$-hydroxyethyl)-amines or bis-($\beta$-hydroxypropyl)-amines whose substituent on the nitrogen atoms is an aliphatic radical having 1 to 20 carbon atoms, a cycloaliphatic radical having 6 to 12 carbon atoms, an araliphatic radical having 7 to 10 carbon atoms or an aryl radical having 6 to 8 carbon atoms. The radicals may be unsaturated, for example they may contain an olefinic double bond or bear substituents which are inert under the reaction conditions, such as alkoxy groups having 1 to 4 carbon atoms, nitro groups, aromatically combined chlorine atoms or carboxylic ester groups having 2 to 7 carbon atoms. Particularly preferred starting materials are those bearing as substituent on the nitrogen atom an alkyl group having 1 to 18 carbon atoms, a cycloalkyl group having 6 to 8 carbon atoms, an aralkyl group having 7 to 8 carbon atoms or a phenyl radical, particularly an alkyl radical having 2 to 18 carbon atoms. Specific examples of suitable starting materials are N-butyl-bis-($\beta$-hydroxyethyl)-amine,
N-dodecyl-bis-($\beta$-hydroxyethyl)-amine,
N-stearyl-bis-($\beta$-hydroxyethyl)-amine,
N-cyclohexyl-bis-($\beta$-hydroxyethyl)-amine,
N-cyclooctyl-bis-($\beta$-hydroxyethyl)-amine,
N-benzyl-bis-($\beta$-hydroxyethyl)-amine,
N-phenyl-bis-($\beta$-hydroxyethyl)-amine,
N-p-chlorophenyl-bis-($\beta$-hydroxyethyl)-amine,
N-butyl-bis-($\beta$-hydropropyl)-amine,
N-tridecyl-bis-($\beta$-hydroxypropyl)-amine, and
N-cyclohexyl-bis-($\beta$-hydroxypropyl)-amine.

The reaction is carried out in the presence of a water-eliminating catalyst. Suitable water-eliminating catalysts include those conventionally used in industry; aluminum oxide and silicates, particularly alkali metal silicates, alkaline earth metal silicates and aluminum silicates, have proved to be especially suitable. Aluminum oxide has achieved special importance as a water-eliminating catalyst. The catalysts may be arranged in a fixed bed or used in a fluidized bed.

The reaction is carried out at temperatures of from 180° to 270° C. Temperatures of from 220° to 260° C. have proved to be particularly advantageous.

Organic solvents which boil above 150° C. have proved to be very suitable as high-boiling organic solvents for use in the reaction. Higher alkanols particularly those having six to fourteen carbon atoms, diols having two to six carbon atoms, such as glycol or propylene glycol, and hydrocarbons boiling above 150° C., such as decahydronaphthalene and tetrahydronaphthalene, have proved to be particularly suitable. Alkanols having 6 to 14 carbon atoms have acquired special industrial importance as solvents for use in the reaction. It is advantageous to use 0.1 to 0.3 part by weight of high-boiling organic solvent or water for each part by weight of N-substituted bis-($\beta$-hydroxyethyl)-amine or bis-($\beta$-hydroxypropyl)-amine.

The process according to the invention may be carried out for example by passing the N-substituted bis-($\beta$-hydroxyethyl)-amine or bis-($\beta$-hydroxypropyl)-amine with the said amount of organic solvent or water over a fixed-bed catalyst as described above in a vertical tube at the specified temperatures. The reaction mixture obtained is purified by fractional distillation. The solvent used and the unreacted N-substituted bis-($\beta$-hydroxyethyl)-amine or bis-($\beta$-hydroxypropyl)-amine may be used again for the reaction.

The N-substituted morpholines prepared by the process according to the invention are suitable for the production of surfactants and as anticorrosives as well as for the production of plant protection agents.

The invention is illustrated by the following examples in which parts are by weight.

EXAMPLE 1

A vertical tube having a length of 1.5 meters and an internal width of 42 mm. is charged with a catalyst consisting of aluminum oxide on aluminum silicate and heated to 240° C. 100 g. per hour of a mixture consisting of 80 parts of N-bis-($\beta$-hydroxyethyl)-aniline and 20 parts of water is introduced at the top of the tube. The discharge obtained is separated into an aqueous phase and an organic phase. The organic phase is fractionally distilled in vacuo. N-phenylmorpholine having a melting point of 53° to 54° C. and a boiling point of 267° to 270° C. is obtained in a yield of 78% with reference to N-bis-(β-hydroxyethyl)-aniline used.

EXAMPLE 2

A vertical tube having a length of 1.5 meters and an internal width of 24 mm. is filled with aluminum oxide and heated to 255° to 260° C. 100 g. per hour of a mixture consisting of 80 parts of N-bis-(β-hydroxyethyl)-stearylamine and 20 parts of isooctanol is metered in at the top of the tube. The discharge obtained is freed from solvent by distillation and then fractionally distilled in vacuo. N-stearylmorpholine having a melting point of 25° to 24° C. and a boiling point of 228° to 230° C. at 5 mm. Hg is obtained in a yield of 55% with reference to N-bis-(β-hydroxyethyl)-stearylamine used.

EXAMPLE 3

The procedure of Example 2 is followed but a mixture of 80 parts of N-bis-(β-hydroxyethyl)-cyclohexylamine and 20 parts of isooctanol is used as starting material. N-cyclohexylmorpholine having a boiling point of 240° to 241° C. is obtained in a yield of 60% with reference to N-bis-(β-hydroxyethyl)-cyclohexylamine used.

What is claimed is:

1. In a process for the production of a N-substituted morpholine by heating the correspondingly N-substituted bis-(β-hydroxyethyl) - amine or bis - (β-hydroxypropyl)-amine in the presence of a water-eliminating catalyst, said N-substituent being a member selected from the group consisting of alkyl of 1 to 18 carbon atoms, cycloalkyl of 6 to 12 carbon atoms, aralkyl of 7 to 8 carbon atoms, phenyl and p-chlorophenyl, the improvement which comprises carrying out the reaction at a temperature of from 180° to 270° C. in the presence of an organic solvent which boils at above 150° C. and which is inert under the reaction conditions or in the presence of water.

2. A process as claimed in claim 1 wherein the N-substituted bis-(β-hydroxyethyl)-amine or bis-(β-hydroxypropyl)-amine used has, as substituent on the nitrogen atom, alkyl of from 2 to 18 carbon atoms, cycloalkyl of from 6 to 8 carbon atoms, benzyl or phenyl.

3. A process as claimed in claim 1 wherein aluminum oxide is used as water-eliminating catalyst.

4. A process as claimed in claim 1 wherein an aluminum silicate is used as water-eliminating catalyst.

5. A process as claimed in claim 1 carried out at a temperature of from 220° to 260° C.

6. A process as claimed in claim 1 wherein an alkanol having 6 to 14 carbon atoms, a diol having 2 to 6 carbon atoms or a hydrocarbon which boils at above 150° C. is used as the high-boiling inert organic solvent.

7. A process as claimed in claim 1 wherein 0.1 to 0.3 part by weight of an organic solvent boiling above 150° C. or water is used for each part by weight of N-substituted bis-(β-hydroxyethyl)-amine or bis-(β-hydroxypropyl)-amine.

References Cited

UNITED STATES PATENTS 2,597,260   5/1952   Reck _____ 260—247

ALEX MAZEL, Primary Examiner

J. TOVAR, Assistant Examiner

UNITED STATES PATENT OFFICE
CERTIFICATE OF CORRECTION

Patent No. 3,649,627        Dated March 14, 1972

Inventor(s) Ernst Fuerst et al

It is certified that error appears in the above-identified patent and that said Letters Patent are hereby corrected as shown below:

Column 2, line 19, "($\beta$-hydropropyl)" should read --($\beta$-hydroxypropyl) --.

Column 3, line 15, "25°" should read -- 23° --.

Column 4, line 1, claim 1, "$\rho$-chlorophenyl" should read -- $\beta$-chlorophenyl --.

Signed and sealed this 26th day of September 1972.

(SEAL)
Attest:

EDWARD M. FLETCHER, JR.                ROBERT GOTTSCHALK
Attesting Officer                      Commissioner of Patent